(12) United States Patent
Sameshima (10) Patent No.: US 6,674,891 B1
(45) Date of Patent: Jan. 6, 2004

(54) CYLINDRICAL-SHAPED WORKPIECE EVALUATION METHOD AND EVALUATION APPARATUS

(75) Inventor: Yoshifumi Sameshima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 573 days.

(21) Appl. No.: 09/714,461

(22) Filed: Nov. 17, 2000

(30) Foreign Application Priority Data

Nov. 18, 1999 (JP) .......................................... 11-328709

(51) Int. Cl.$^7$ ................................................ G06K 9/00
(52) U.S. Cl. ...................................... 382/152; 702/155
(58) Field of Search ................................ 382/152, 154; 702/34, 35, 155; 345/419–427; 356/12–22; 700/56, 61, 186, 159–195; 701/1, 124

(56) References Cited

U.S. PATENT DOCUMENTS

| 4,296,474 A | * 10/1981 | Hurt ............................ 702/168 |
| 5,046,852 A | * 9/1991 | Hametner et al. ........... 356/398 |
| 5,243,665 A | * 9/1993 | Maney et al. ................ 382/152 |
| 5,627,771 A | * 5/1997 | Makino ....................... 702/155 |
| 6,564,111 B1 | * 5/2003 | Gottschald .................. 700/95 |

FOREIGN PATENT DOCUMENTS

| EP | 0 348 709 | * 1/1990 |
| JP | A599636 | 4/1993 |
| JP | A721238 | 1/1995 |
| JP | A10175141 | 6/1998 |
| JP | 11-33958 | * 2/1999 |

* cited by examiner

*Primary Examiner*—Samir Ahmed
(74) *Attorney, Agent, or Firm*—Birch, Stewart, Kolasch & Birch, LLP (57) ABSTRACT

To provide an evaluation method and an evaluation apparatus for a cylindrical-shaped workpiece designated by a shape developed on a two-dimensional plane. A single two-dimensional reference shape data is substantially designated from a hard disk which includes a plurality of two-dimensional reference shape data based on a two-dimensional shape displayed on a two-dimensional plane where a curved surface of a reference cylindrical-shaped workpiece is developed. A reference cylindrical-shaped workpiece having a curved surface with a two-dimensional shape corresponding to the read two-dimensional reference shape data is converted by a converter into a surface shape of the reference cylindrical-shaped workpiece. In addition, a surface shape of an evaluation object cylindrical-shaped workpiece is measured, and a distance between a measurement point in the measurement and a point in the surface shape of the reference cylindrical-shaped workpiece corresponding to the measurement point is obtained by a calculator. The distance obtained by the calculator is overlay-displayed as an error on the two-dimensional shape corresponding to the two-dimensional reference shape data read from the hard disk, under the control of a display controller. The evaluation object cylindrical-shaped workpiece is evaluated based on the two-dimensional display where the error is overlay-displayed.

9 Claims, 5 Drawing Sheets

CYLINDRICAL-SHAPED WORKPIECE EVALUATION METHOD AND EVALUATION APPARATUS

BACKGROUND OF THE INVENTION

1. Field of the Invention

The present invention relates to a cylindrical-shaped workpiece evaluation method and an evaluation apparatus therefor. More particularly, the present invention relates to a cylindrical-shaped workpiece evaluation method and an evaluation apparatus for evaluating a cylindrical-shaped workpiece based on a shape developed on a two-dimensional plane.

2. Description of Related Art

A conventional three-dimensional-shaped workpiece evaluation method for evaluating a three-dimensional-shaped workpiece by using a general three-dimensional measuring machine is known from JP-A No. H7-21238.

A general three-dimensional measuring machine used in the three-dimensional-shaped workpiece evaluation method is known from JP-A No. H5-99636 to perform measurement without contact with the three-dimensional-shaped workpiece, and from JP-A No. H10-175141 to perform measurement with contact with the three-dimensional-shaped workpiece.

These three-dimensional measuring machines have a moving member movable in x, y and z axial directions and a needle provided in the moving member. The machines measure the shape of the three-dimensional-shaped workpiece by bringing the needle into contact with the outer shape of the three-dimensional-shaped workpiece and detecting three-dimensional coordinates of the moving member during contact.

Furthermore, in the case of non-contact measurement, in place of the needle, a laser beam outputted from a laser unit is emitted on the three-dimensional-shaped workpiece so as to detect a distance from the three-dimensional-shaped workpiece. When the distance becomes a predetermined value, the coordinates of the laser unit are detected, to detect the shape of the three-dimensional-shaped workpiece. In the measurement by this three-dimensional measuring machine, a measurement value is obtained as coordinates of a point in an orthogonal coordinate system.

Upon evaluation of the three-dimensional-shaped workpiece by using the three-dimensional measuring machine, a three-dimensional-shaped workpiece as an evaluation reference is similarly set as a three-dimensional object by data in a three-dimensional orthogonal coordinate system.

Accordingly, the above-described conventional evaluation method obtains a pre-stored shape database based on a shape in the three-dimensional orthogonal coordinate system as an evaluation reference, and measurement data in the orthogonal coordinate system obtained by measuring the three-dimensional-shaped workpiece by the three-dimensional measuring machine, then reads the obtained measurement data and the shape data as an evaluation reference corresponding to the measurement data from the shape database, then extracts a point on the read shape data as the evaluation reference and a point on the measurement data corresponding to the point on the shape data, then calculates a distance between the corresponding points, thus performing evaluation on the three-dimensional-shaped workpiece. Furthermore, the method visually facilitates evaluation by color-coded display in correspondence with the distance between the points.

In the case of evaluation of a shape formed on a curved surface of a cylindrical-shaped member by the conventional three-dimensional-shaped workpiece evaluation method, shape measurement is also made in a three-dimensional orthogonal coordinate system space.

However, a flat shape including the position of a groove 21 (hereinbelow, also referred to as a "groove peripheral shape") formed in a curved surface of a cylindrical-shaped workpiece 20 schematically shown in FIG. 5, such as the shape of a shift drum used as a transmission for a motorcycle or the shape of a torque cam used as a belt type transmission for a motorcycle, can be designated with more advantage, not as figure data in a three-dimensional orthogonal coordinate system, but as a shape developed on a two-dimensional plane.

If the evaluation of a cylindrical-shaped workpiece is to be performed by the above conventional three-dimensional-shaped workpiece evaluation method, the measurement by the three-dimensional measuring machine and shape evaluation of the workpiece evaluation object are both based on three-dimensional orthogonal coordinates. Accordingly, it is necessary to convert figure data on a two-dimensional plane into a three-dimensional orthogonal coordinate system for correspondence with the measurement result in the three-dimensional orthogonal coordinate system. Furthermore, the evaluation result obtained in the three-dimensional orthogonal coordinate system cannot always be effectively used.

Figure 5:
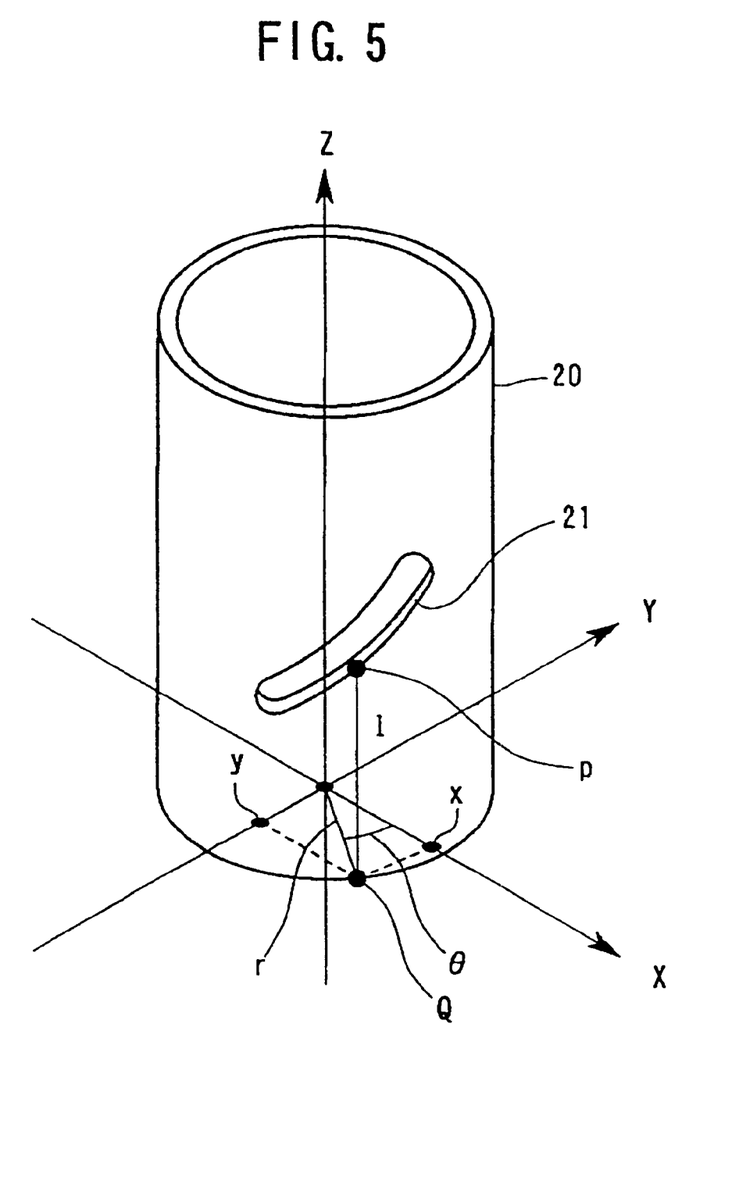
FIG. 5 is a perspective view showing an example of the cylindrical-shaped workpiece.

More specifically, as shown in FIG. 5, the groove peripheral shape of the groove 21 on the curved surface of the cylindrical-shaped workpiece 20 is determined by a surface function $T(r, \theta, l)$ in a cylindrical coordinate system. Note that r represents a radius of the cylindrical shape base. Assuming that a point on the edge of the cylindrical shape base opposite to a point (p) on the groove peripheral shape of the groove 21 is (Q), and the cylindrical-shaped workpiece 20 is placed on an xy plane with the central point of the cylindrical-shaped workpiece 20 corresponding to the origin of the xy coordinates, represents an angle between the axis x and the point (Q) on the edge of the cylindrical shape base; $(r, \theta)$, a position in polar coordinates on the xy plane defining the point (Q) on the edge; and l, a length of the normal from the point (p) to the point (Q).

However, in the cylindrical-shaped workpiece 20, in a case where the position of the point (p) on the curved surface of the cylindrical-shaped workpiece 20 is significant, i.e., the position of the point (Q) on the edge and the length (l) from the point (Q) to the point (p) in the axial direction of the cylindrical-shaped workpiece 20 are significant, but the position of the base of the cylindrical-shaped workpiece 20 in the radial (r) direction is not so significant, if three-dimensional-shaped workpiece evaluation is performed based on measurement by a three-dimensional measuring machine which handles the position (x, y, l) of the respective points on the groove periphery as the position (x,y, z) in a three-dimensional orthogonal coordinate system, the three-dimensional-shaped workpiece evaluation based on the measurement result by the three-dimensional measuring machine is performed regardless of the above features of the cylindrical-shaped workpiece 20. Thus the absolute value is erroneously displayed at the same ratio in every direction in the three-dimensional orthogonal coordinate space. Such erroneous display effects correct evaluation and increases the number of process steps.

SUMMARY OF THE INVENTION

An object of the present invention is to provide an evaluation method and an evaluation apparatus for a cylindrical-shaped workpiece designated as a shape developed on a two-dimensional plane.

The cylindrical-shaped workpiece evaluation method of the present invention comprises:

a first step of reading two-dimensional reference shape data based on a two-dimensional shape designated by designation means from storage means holding plural two-dimensional reference shape data based on a two-dimensional shape displayed on a two-dimensional plane where a curved surface of a reference cylindrical-shaped workpiece is developed;

a second step of converting the reference cylindrical-shaped workpiece having a two-dimensional-shaped curved surface corresponding to the two-dimensional reference shape data read at said first step into a surface shape of said reference cylindrical-shaped workpiece;

a third step of measuring a surface shape of an evaluation object cylindrical-shaped workpiece and obtaining a distance between a measurement point in said measurement and a point in the surface shape of the reference cylindrical-shaped workpiece converted at said second step, corresponding to said measurement point; and a fourth step of overlay-displaying the distance obtained at said third step as an error on the two-dimensional shape corresponding to the two-dimensional reference shape data read at said first step, wherein the evaluation object cylindrical-shaped workpiece is evaluated based on the two-dimensional display where the error is overlay-displayed at said fourth step.

The cylindrical-shaped workpiece evaluation apparatus of the present invention comprises:

storage means for storing plural two-dimensional reference shape data based on a two-dimensional shape displayed on a two-dimensional plane where a curved surface of a reference cylindrical-shaped workpiece is developed;

designation means for designating one two-dimensional reference shape data read from said storage means based on the two-dimensional shape;

conversion means for converting the reference cylindrical-shaped workpiece having a curved surface having a two-dimensional shape corresponding to the two-dimensional shape data read from said storage means into a surface shape of said reference cylindrical-shaped workpiece;

calculation means for measuring a surface shape of an evaluation object cylindrical-shaped workpiece and obtaining a distance between a measurement point in said measurement and a point in the surface shape of the reference cylindrical-shaped workpiece converted at said second step, corresponding to said measurement point;

display control means for overlay-displaying the distance obtained by said calculation means as an error on the two-dimensional shape corresponding to the two-dimensional reference shape data read from said storage means, p1 wherein the evaluation object cylindrical-shaped workpiece is evaluated based on the two-dimensional display where the error is overlay-displayed.

According to the cylindrical-shaped workpiece evaluation method and evaluation apparatus of the present invention, one two-dimensional reference shape data is substantially designated and read from the storage means holding plural two-dimensional reference shape data based on a two-dimensional shape displayed on a two-dimensional plane where a curved surface of a reference cylindrical-shaped workpiece is developed. A reference cylindrical-shaped workpiece having a curved surface with a two-dimensional shape corresponding to the read two-dimensional reference shape data is converted to the surface shape of the reference cylindrical-shaped workpiece.

On the other hand, the surface shape of the evaluation object cylindrical-shaped workpiece is measured, and the distance between a measurement point by the measuring machine and a point in the surface shape of the reference cylindrical-shaped workpiece corresponding to the measurement point is obtained. The obtained distance is overlay-displayed as an error on the two-dimensional shape corresponding to the two-dimensional reference shape data read from the storage means. The evaluation object cylindrical-shaped workpiece is evaluated based on the two-dimensional display where the error is overlay-displayed.

According to the cylindrical-shaped workpiece evaluation method and evaluation apparatus of the present invention, a cylindrical-shaped workpiece designated with a shape developed on a two-dimensional plane can be easily and accurately evaluated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Hereinbelow, the cylindrical-shaped workpiece evaluation method and evaluation apparatus according to the present invention will be described by considering the evaluation apparatus for performing the cylindrical-shaped workpiece evaluation method.

Figure 1:
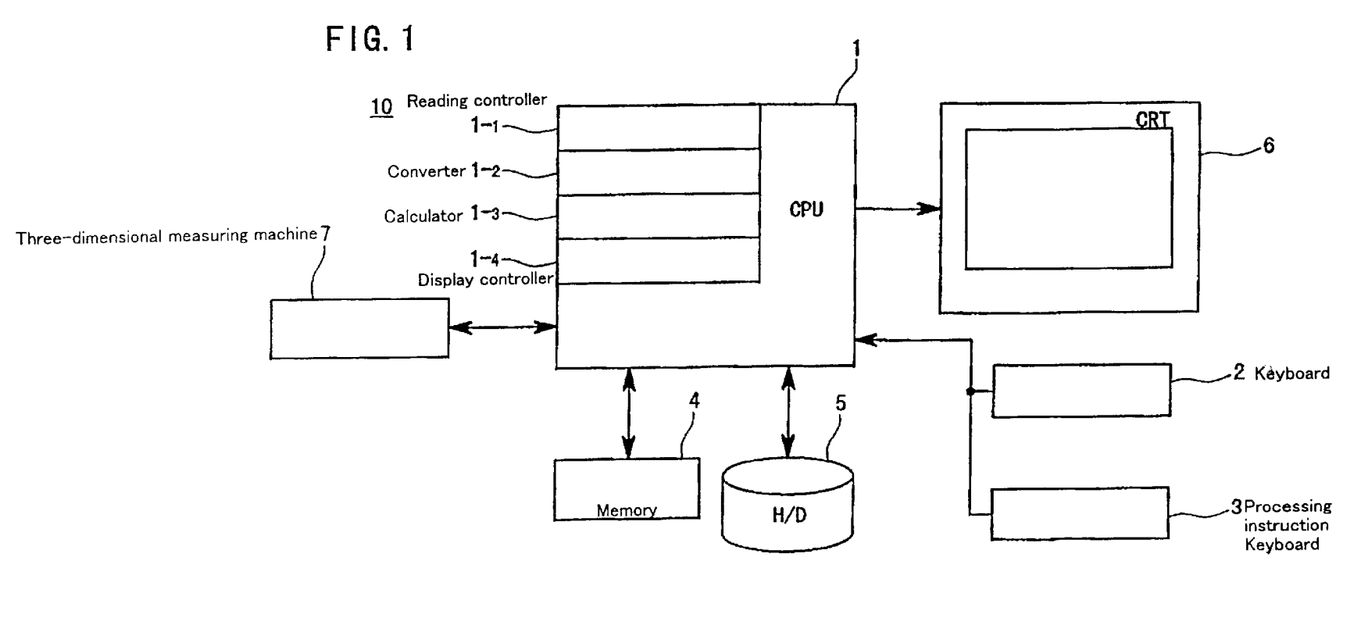
FIG. 1 is a block diagram showing the construction of the evaluation apparatus for performing the cylindrical-shaped workpiece evaluation method according to the working example of the present invention.

FIG. 1 is a block diagram showing the construction of the evaluation apparatus for performing the cylindrical-shaped workpiece evaluation method according to a working example of the present invention.

Description will be made on evaluation of the cylindrical-shaped workpiece 20 having a groove such as a torque cam used in a belt type transmission of a motorcycle by using an evaluation apparatus 10 for performing the cylindrical-shaped workpiece evaluation method according to the working example of the present invention.

The evaluation apparatus 10 for performing the cylindrical-shaped workpiece evaluation method according to a working example of the present invention has a central processing device 1 comprising a CPU; a keyboard 2 with keys for input of figures, characters and the like into the central processing device 1; a processing instruction keyboard 3 with function keys for figure input instruction, display instruction, program change instruction and the like for the central processing device 1; a memory 4 having a work area in which data processed by the central processing device 1 is stored based on an instruction from the central processing device 1, as an internal storage device from which stored data is read; a hard disk 5, in which plural two-dimensional reference data, based on a two-dimensional shape displayed on a two-dimensional plane, where a curved surface of a reference cylindrical-shaped workpiece as a reference to an evaluation object cylindrical-shaped workpiece is developed, are stored in advance, and from which the data is read based on an instruction from the central processing device 1 and transmitted to the central processing device 1; and a CRT 6 as a CAD display device which performs display based on output from the central processing device 1.

Furthermore, the apparatus has a three-dimensional measuring machine 7, which is selectively connected to the central processing device 1, and which measures a surface shape of the cylindrical-shaped workpiece 20.

The central processing device 1 functionally has a reading controller 1-1 which reads the two-dimensional reference shape data based on the two-dimensional reference shape displayed on the two-dimensional plane, where the curved surface of the reference cylindrical-shaped workpiece is developed, from the hard disk 5, based on an instruction based on the two-dimensional reference shape from keys of the keyboard 2 and the processing instruction keyboard 3; a converter 1-2 which converts the reference cylindrical-shaped workpiece having a curved surface with a two-dimensional shape, corresponding to the two-dimensional reference shape data read from the hard disk 5 under the control of the reading controller 1-1, into the surface shape of the reference cylindrical-shaped workpiece; a calculator 1-3 which obtains a distance between a measurement point in the surface shape of a cylindrical-shaped workpiece measured by the three-dimensional measuring machine 7 and a point in the surface shape of the reference cylindrical-shaped workpiece converted by the converter 1-2, corresponding to the measurement point; and a display controller 1-4 which overlay-displays the distance obtained by the calculator 1-3 as an error on the two-dimensional shape corresponding to the two-dimensional reference shape data read from the hard disk 5.

Figure 2:
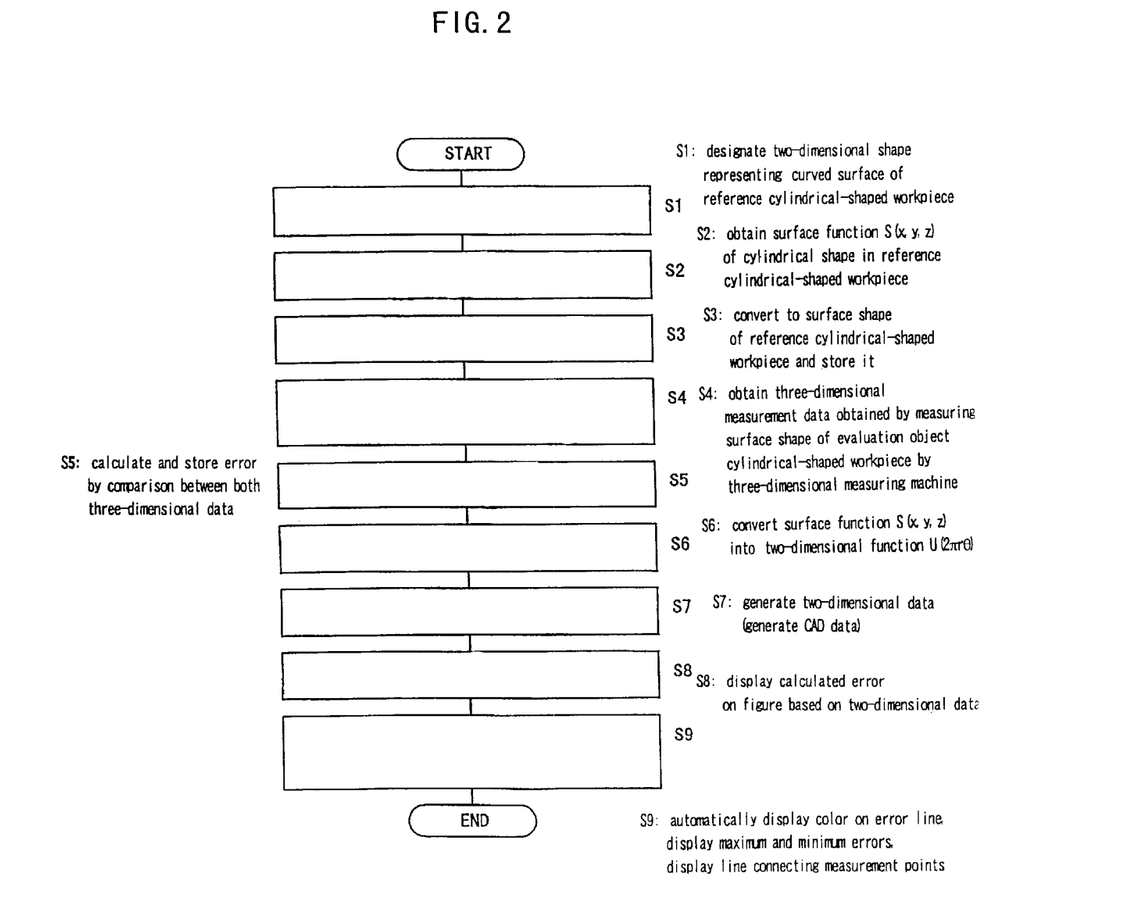
FIG. 2 is a flowchart for explanation of the operation in the case of evaluation by the evaluation apparatus in FIG. 1.

The operation of the evaluation apparatus 10 constructed as above will be described in accordance with the flowchart of FIG. 2.

When evaluation start is instructed, with regard to a two-dimensional shape displayed on the two-dimensional plane where the curved surface of the evaluation object cylindrical-shaped workpiece is developed, two-dimensional reference shape data as a reference is designated (step S1). The designation at step S1 is made by designation of a two-dimensional shape corresponding to the two-dimensional reference shape data as an evaluation reference previously stored in the hard disk 5.

Figure 3:
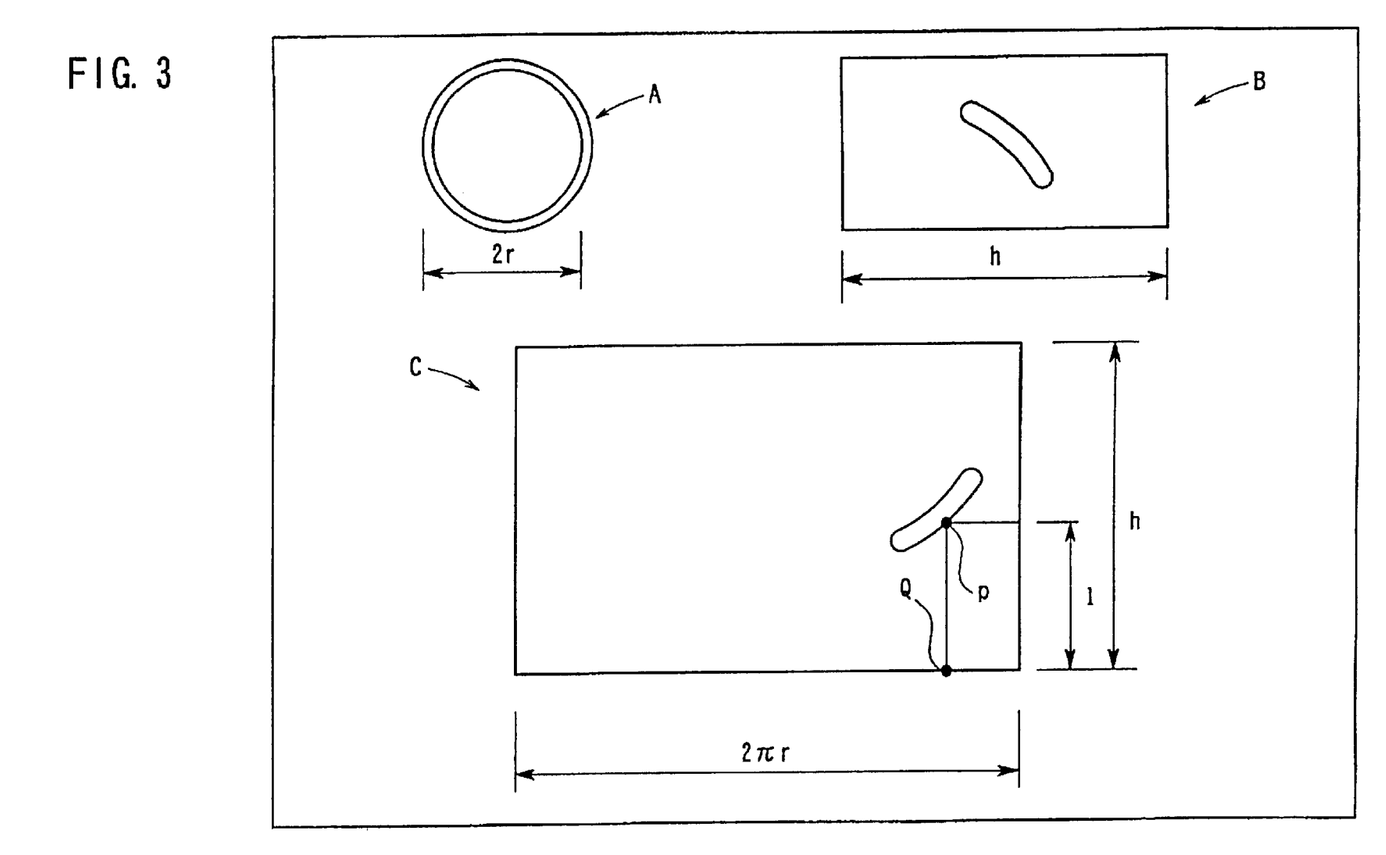
FIG. 3 is a schematic diagram for explanation of the operation in the case of evaluation by the evaluation apparatus in FIG. 1.

More specifically, with regard to the two-dimensional shape displayed on the two-dimensional plane where the curved surface of the reference cylindrical-shaped workpiece is developed, i.e., in correspondence with the developed view of FIG. 3C, a radius r, a height h and a surface function T (r, θ, l) of the cylindrical shape are designated.

In this manner, as it is apparent from the developed view of FIG. 3C, the two-dimensional reference shape data is designated by designation of the two-dimensional shape of the curved surface as an evaluation reference, by designation of the two-dimensional shape of the curved surface with the radius r of the base of the cylindrical shape, the height h and the groove peripheral shape. That is, the reference cylindrical shape is substantially designated by designation of the radius r and the height h, thus the cylindrical shape is specified by the designation. Furthermore, by designation of the surface function T(r, θ, l) corresponding to the position of the groove periphery and its shape, the two-dimensional shape based on the developed view of the curved surface, where the groove periphery shape is formed, of the cylindrical-shaped workpiece 20 is specified, as shown in the developed view of FIG. 3C.

Since the reference cylindrical-shaped workpiece is described in the developed view shown in FIG. 3C, the two-dimensional shape of the curved surface of the reference cylindrical-shaped workpiece with respect to the two-dimensional shape of the curved surface of the evaluation object cylindrical-shaped workpiece can be substantially specified by designating only the shape by the developed view.

Following step S1, a surface function corresponding to the two-dimensional shape of the curved surface of the reference cylindrical-shaped workpiece, i.e., a surface function S(x, y, z) based on a three-dimensional orthogonal coordinate system is obtained by reference to the designation at step S1 (step S2). The surface function S(x, y, z) based on the three-dimensional orthogonal coordinate system is mutually convertible to the surface function T(r, θ, l) based on the cylindrical function system, and can be easily obtained from the surface function T(r, θ, l).

Note that the conversion into the surface function S(x, y, z) based on the three-dimensional orthogonal coordinate system is made since comparison with a measurement object three-dimensional surface shape by the surface function S(x, y, z) can be made easily and accurately.

Following step S2, the reference cylindrical-shaped workpiece in which a reference groove peripheral shape is formed based on the information from steps S1 and S2 is converted to a surface shape of the reference cylindrical-shaped workpiece, and data on the converted surface shape is temporarily stored in the memory 4 (step S3).

In this case, the data based on the surface shape at step S3 corresponds to coordinate position data in the three-dimensional orthogonal coordinate system of the respective measurement points in the case of measurement of the surface shape of the reference cylindrical-shaped workpiece by the three-dimensional measuring machine 7.

By the execution of step S3, the data based on the surface shape of the cylindrical-shaped workpiece 20 having the groove 21 as an evaluation reference on its curved surface, as schematically shown in FIG. 5, is stored in the memory 4.

Following step S3, the surface shape of the evaluation object cylindrical-shaped workpiece is measured as three-dimensional orthogonal coordinate system data by the three-dimensional measuring machine 7. The three-dimensional orthogonal coordinate system measurement data based on the surface shape of the evaluation object cylindrical-shaped workpiece is then obtained, and temporarily stored in the memory 4 (step S4).

Three-dimensional data of mutually-corresponding points in the measurement data (three-dimensional data) based on the surface shape of the evaluation object cylindrical-shaped workpiece, stored at step S4, and in the data (three-dimensional data) based on the surface shape of the reference cylindrical-shaped workpiece stored at step S3, are compared with each other, and the distance between the corresponding points is obtained as an error. The error information is temporarily stored in the memory 4 (step S5).

The comparison and calculation of distance as an error at step S5 are made by obtaining data difference between the measurement data of respective points based on the surface shape of the evaluation object cylindrical-shaped workpiece, measured by the three-dimensional measuring machine 7, and the respective points based on the surface shape of the evaluation-reference cylindrical-shaped workpiece corresponding to the above points. This corresponds to acquisition of linear dimension between corresponding points in, e.g., a virtual overlay of the surface shape of the evaluation object cylindrical-shaped workpiece on the surface shape of the reference cylindrical-shaped workpiece, as an error. The obtained error between the respective points is stored.

Following step S5, the surface function $S(x, y, z)$ designated at step S2 is converted into a two-dimensional function $U(2\pi r\theta, l)$ (step S6).

The conversion of the surface function $S(x, y, z)$ into the two-dimensional function $U(2\pi r\theta, l)$ will be described. The respective points (p) of the curved surface of the reference cylindrical-shaped workpiece are defined by the surface function $T(r, \theta, l)$ in the cylindrical coordinate system. However, since the radius (r) of the base of the cylindrical shape of the reference cylindrical-shaped workpiece is fixed, the points (p) constructing the shape formed in the curved surface of the reference cylindrical-shaped workpiece can be converted into the two-dimensional function $U(2\pi r\theta, l)$.

Following step S6, two-dimensional data (CAD data) is generated based on the two-dimensional function $U(2\pi r\theta, l)$ (step S7). The display based on the two-dimensional data generated at step S7 is, e.g., as shown in the developed view of FIG. 3C, corresponding to the display of the reference cylindrical-shaped workpiece.

Following step S7, the error obtained at step S5 is displayed on the display based on the two-dimensional data generated at step S7 (step S8). An example of the display is as shown in FIG. 4(a). In FIG. 4(a), reference numeral 20A denotes a developed view where the error of the curved surface of the evaluation object cylindrical-shaped workpiece is overlaid on the developed view of the curved surface of the reference cylindrical-shaped workpiece shown in FIG. 3C. Reference numeral 21A denotes a display corresponding to the curved surface of the reference cylindrical-shaped workpiece shown in the developed view of FIG. 3C, where numerals 22A, 22B and 22C and the like denote a display of overlay-displayed calculated errors, represented with error lines having lengths corresponding to the obtained errors at positions of the errors.

Following step S8, the error lines are automatically colored, then the maximum and minimum values of the errors are obtained. The maximum error is displayed with "max", and the minimum error, with "min." Furthermore, the distal ends of the error lines are connected by a continuous line (step S9).

An example of the display of max, the display of min, allotted at step S9, and the continuous line connecting the error lines is as shown in FIG. 4(b).

Figure 4:
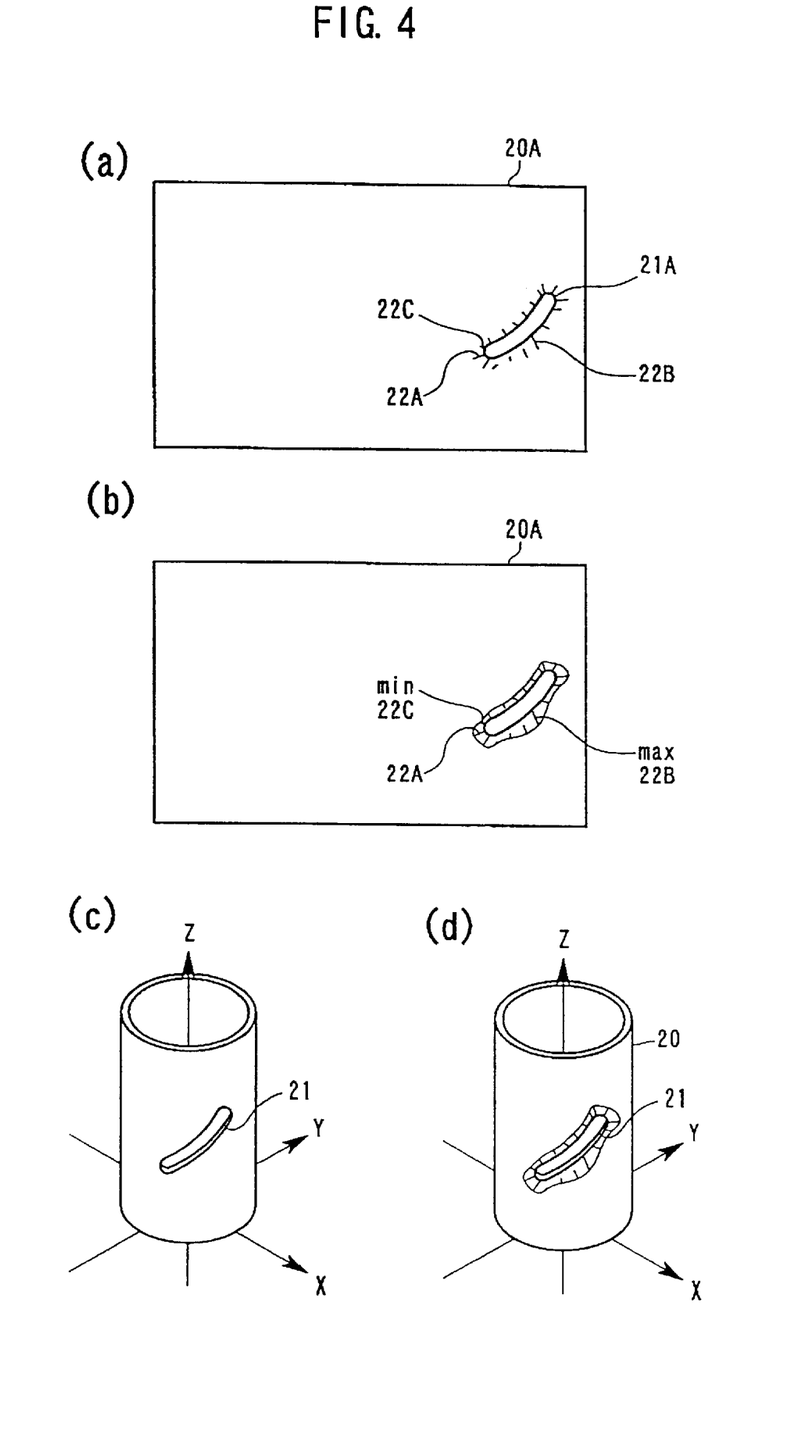
FIGS. 4(a), 4(b), 4(c), and 4(d) are schematic diagrams for explanation of the operation in the case of evaluation by the evaluation apparatus in FIG. 1.

FIG. 4 (c) shows a perspective view of the reference cylindrical-shaped workpiece having the groove 21 and FIG. 4(d) shows a perspective view of the evaluation object cylindrical-shaped workpiece 20 having the errors shown in FIG. 4(b) virtually showing a state where the groove 21 has errors.

Note that in the above-described evaluation apparatus 10, one groove 21 is provided on the curved surface; however, the operation is performed in a similar manner in a case where plural different grooves are provided on the curved surface.

Furthermore, the groove 21 has a depth; however, if the respective points (p) constructing the groove peripheral shape displayed on the two-dimensional plane have depth attributes, the depth of the groove 21 (corresponding to the position in the radial direction in the cylindrical-shaped workpiece 20) can be checked in accordance with necessity, in addition to the groove peripheral shape.

Note that in the above, the groove 21 is used; however, the groove 21 may be replaced with a peripheral shape formed as a closed curve such as a hole.

Next, the effect of the evaluation apparatus 10 will be described below.

In a case where the surface shape of the three-dimensional cylindrical-shaped workpiece 20 is simply measured and developed, a central axial line or the like as a reference is influenced by an error of the curved surface. For example, in a case where the cylindrical shape is not correct and an actual cam axial line and the central axis of the cylindrical-shaped workpiece 20 are shifted from each other, or in a case where a cross section of the cylindrical-shaped workpiece 20 is out of perfect round, a large number of steps are required to calculate the curved surface of the cylindrical-shaped workpiece 20 from the measurement point group on the surface. Furthermore, the coordinate reference of the calculated shape of the curved surface and a reference value in design may not correspond with each other.

Furthermore, in a case where the curved surface is developed in two dimensions from measured values and then compared with designing reference measurements, the error in any of the three-dimensional orthogonal coordinates (x, y, z) appearing in the two-dimensional plane ($\theta$, l) is unknown.

On the other hand, during use of the evaluation apparatus 10, three-dimensional cylindrical shape data as a reference is generated from the two-dimensional developed view of the original view. Errors are then obtained by substantially overlaying the data on the measurement data obtained by measuring the evaluation object cylindrical-shaped workpiece by the three-dimensional measuring machine 7, and the obtained error data is overlay-displayed on the two-dimensional developed view as an original reference. Accordingly, the rotational axis of the evaluation object cylindrical-shaped workpiece can be correctly overlaid on the rotational axis of the designing rotational axis, i.e., the rotational axis of the reference cylindrical-shaped workpiece.

Accordingly, the distortion of the evaluation object cylindrical-shaped workpiece itself can be accurately projected on the reference cylindrical-shaped workpiece. Furthermore, the radial-direction error of the groove 21 of the evaluation object cylindrical-shaped workpiece can be accurately developed. Furthermore, the obtained error (three-dimensional Δx, Δy, Δz) can be easily converted to the error (two-dimensional Δθ, Δl).

As described above, according to the cylindrical-shaped workpiece evaluation method and evaluation apparatus of the present invention, since a workpiece designed and processed and evaluated in two dimensions can be evaluated on a two-dimensional plane while being measured by utilizing a high-precision three-dimensional measuring machine, an evaluation operator can easily perform an evaluation, and the number of steps for evaluation can be reduced.

Furthermore, since a special-purpose measuring machine for measurement of a cylindrical-shaped workpiece is unnecessary and the conventionally-used three-dimensional measuring machine can be used, investment is not required, and high general versatility is attained.

Furthermore, since the distance between the three-dimensional measurement data and the three-dimensional reference shape data is obtained, high precision can be attained.

Furthermore, since the distance between the three-dimensional measurement data and the three-dimensional reference shape data is obtained and then converted on the two-dimensional plane, high precision can be attained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cylindrical-shaped workpiece evaluation method comprising the steps of:
   reading two-dimensional reference shape data, based on a two-dimensional shape designated by a designation means, from a storage means holding a plurality of two-dimensional reference shape data based on a two-dimensional shape displayed on a two-dimensional plane, where a curved surface of a reference cylindrical-shaped workpiece is developed;
   converting the reference cylindrical-shaped workpiece having a two-dimensional-shaped curved surface corresponding to the two-dimensional reference shape data read at said reading step into a surface shape of said reference cylindrical-shaped workpiece;
   measuring a surface shape of an evaluation object cylindrical-shaped workpiece and obtaining a distance between a measurement point in said measurement and a point in the surface shape of the reference cylindrical-shaped workpiece converted at said converting step, corresponding to said measurement point; and
   overlay-displaying the distance obtained at said measuring step as an error on the two-dimensional shape corresponding to the two-dimensional reference shape data read at said reading step,
   wherein the evaluation object cylindrical-shaped workpiece is evaluated based on the two-dimensional display where the error is overlay-displayed at said overlay-displaying step.

2. The cylindrical-shaped workpiece evaluation method according to claim 1, wherein said surface shape of said reference cylindrical-shaped workpiece corresponds to coordinate position data in a three-dimensional orthogonal coordinate system, said step of measuring further comprising the step of measuring a surface shape of said evaluation object cylindrical-shaped workpiece as three-dimensional orthogonal coordinate system data with a three dimensional measuring machine.

3. The cylindrical-shaped workpiece evaluation method according to claim 2, said step of obtaining further comprising the steps of:
   comparing three-dimensional data of mutually-corresponding points in the measurement data based on the surface shape of the evaluation object cylindrical-shaped workpiece with the measurement data based on the surface shape of the reference cylindrical-shaped workpiece; and
   calculating a distance between the corresponding points.

4. A cylindrical-shaped workpiece evaluation apparatus comprising:
   storage means for storing a plurality of two-dimensional reference shape data based on a two-dimensional shape displayed on a two-dimensional plane where a curved surface of a reference cylindrical-shaped workpiece is developed;
   designation means for designating one two-dimensional reference shape data read from said storage means based on the two-dimensional shape;
   conversion means for converting the reference cylindrical-shaped workpiece having a curved surface having a two-dimensional shape corresponding to the two-dimensional shape data read from said storage means into a surface shape of said reference cylindrical-shaped workpiece;
   calculation means for measuring a surface shape of an evaluation object cylindrical-shaped workpiece and obtaining a distance between a measurement point in said measurement and a point in the surface shape of the reference cylindrical-shaped workpiece converted at said second step, corresponding to said measurement point;
   display control means for overlay-displaying the distance obtained by said calculation means as an error on the two-dimensional shape corresponding to the two-dimensional reference shape data read from said storage means,
   wherein the evaluation object cylindrical-shaped workpiece is evaluated based on the two-dimensional display where the error is overlay-displayed.

5. The cylindrical-shaped workpiece evaluation apparatus according to claim 4, wherein said surface shape of said reference cylindrical-shaped workpiece corresponds to coordinate position data in a three-dimensional orthogonal coordinate system, and said calculation means measures a surface shape of said evaluation object cylindrical-shaped workpiece as three-dimensional orthogonal coordinate system data with a three dimensional measuring machine.

6. The cylindrical-shaped workpiece evaluation apparatus according to claim 3, wherein said calculation means compares three-dimensional data of mutually-corresponding points in the measurement data based on the surface shape of the evaluation object cylindrical-shaped workpiece with the measurement data based on the surface shape of the reference cylindrical-shaped workpiece and calculates a distance between the corresponding points.

7. A cylindrical-shaped workpiece evaluation method comprising the steps of:
   designating a two-dimensional shape representing a curved surface of a reference cylindrical-shaped workpiece;

obtaining a surface function of a cylindrical shape in the reference cylindrical-shaped workpiece;

converting the surface function of the cylindrical shape into a three-dimensional surface shape of said reference cylindrical-shaped workpiece;

measuring a three-dimensional surface shape of an evaluation object cylindrical-shaped workpiece;

obtaining a distance between a measurement point in said measurement and a point in the surface shape of the reference cylindrical-shaped workpiece, corresponding to said measurement point; and calculating an error by comparison between the three-dimensional surface shape of reference cylindrical-shaped workpiece and the three-dimensional measurement data;

converting surface function of cylindrical shape in reference cylindrical-shaped workpiece into a two-dimensional function; and generating two-dimensional data; and displaying calculated error based on two-dimensional data.

8. The cylindrical-shaped workpiece evaluation method according to claim 7, wherein said surface shape of said reference cylindrical-shaped workpiece corresponds to coordinate position data in a three-dimensional orthogonal coordinate system, said step of measuring further comprising the step of measuring a surface shape of said evaluation object cylindrical-shaped workpiece as three-dimensional orthogonal coordinate system data with a three dimensional measuring machine.

9. The cylindrical-shaped workpiece evaluation method according to claim 8, said step of obtaining further comprising the steps of:

comparing three-dimensional data of mutually-corresponding points in the measurement data based on the surface shape of the evaluation object cylindrical-shaped workpiece with the measurement data based on the surface shape of the reference cylindrical-shaped workpiece; and calculating a distance between the corresponding points.

* * * * *